June 12, 1928.

H. C. RIES ET AL

AIR BAG

Filed May 13, 1926

Inventors
H.C.Ries
and L.Whyms,
By Lacey & Lacey, Attorneys

Patented June 12, 1928.

1,672,955

UNITED STATES PATENT OFFICE.

HERBERT C. RIES AND LEE WHYMS, OF FOND DU LAC, WISCONSIN.

AIR BAG.

Application filed May 13, 1926. Serial No. 108,936.

This invention relates to improvements in the art of vulcanizing pneumatic tire casings and more particularly to an improved air bag and method of constructing and renewing the same.

Ordinarily, air bags are so constructed that they constitute an integral vulcanized annular body or unit, and after vulcanizing from fifty to seventy-five tires, the entire bag is usually unfit for further use, either because the surface thereof has become scaled, cracked, or roughened, or because a considerable thickness of the bag wall has become overcured, due to impregnation by the sulphur in the rubber of the tires which have been vulcanized. In fact, when the surface of the ordinary bag becomes roughened even to a slight degree, the bag cannot be employed without the formation of rough plates in the inner surface of the tire vulcanized by the use thereof. In an effort to prolong the usefulness of air bags of the ordinary construction, that is to say, integrally vulcanized throughout, attempts have been made to accomplish this result by rasping away the outer surface of the bag to remove a portion of the material and then applying uncured or fresh rubber to the surface and revulcanizing the bag. However, this method of procedure has been found to be unsatisfactory for the reason that it is a tedious one and the re-vulcanized bag possesses precisely the disadvantages which were present in the original bag. This method is further unsatisfactory for the reason that the entire bag shortly becomes overcured, due to the wall thereof becoming impregnated with sulphur from the rubber of the tires being molded. In view of the foregoing, the invention has, as one of its objects, to provide an air bag so constructed that when the surface thereof develops imperfections or becomes roughened, so that it is no longer advisable to employ the bag in the vulcanization of tires, the bag may be provided with a new surface of a character to restore the bag to its initial condition without the necessity of resorting to the task of rasping or buffing the deteriorated surface of the bag as has heretofore been done, and in this connection, the invention contemplates so constructing the bag that it will possess an investing integument which may be readily removed and renewed at a very low cost and at the expenditure of but little time and labor.

Another object of the invention is to effect economy in the construction and use of air bags by providing a bag so constructed that it will possess a body and an investing integument which may be readily and quickly removed from the body, leaving the body intact and in its original form and condition, so that a new integument may be provided about the body, thereby producing an air bag possessing all of the qualities of a new bag.

Another object of the invention is to evolve a novel method of constructing an air bag to provide the same with an investing integument which may be conveniently removed and renewed, and which method may be carried out expeditiously and at low cost and will embody such steps as will result in an air bag comprising a body and an investing integument which for all purposes constitutes an integral part with the body but is yet removable from the body, leaving the surface of the body smooth and unmarred.

Another object of the invention is to evolve a novel method of resurfacing the body of the air bag embodying the invention which method entirely eliminates the task of rasping or buffing the surface of the bag preparatory to resurfacing.

Another object of the invention is to provide an air bag so constructed that it will expand evenly when air, water, or steam, is introduced into the same under pressure preparatory to the vulcanization of a tire and in which construction the union between the body of the bag and the investing integument will be of such character that there will be no disturbance or displacement of the integument which might result in an uneven surface.

Another object of the invention is to provide an air bag so constructed that the body thereof may be repeatedly resurfaced and the resurfacing effected in such a manner that during the process of vulcanization of tires, the sulphur content of the rubber of the tires will not impregnate the body to cause overcuring and consequent hardening thereof, as is certain to occur where the bag constitutes an integrally vulcanized body.

The invention has for another object to so construct the body of the bag that it will not become weakened, as does an ordinary air bag, after repeated periods of inflation and expansion.

Figure 1:
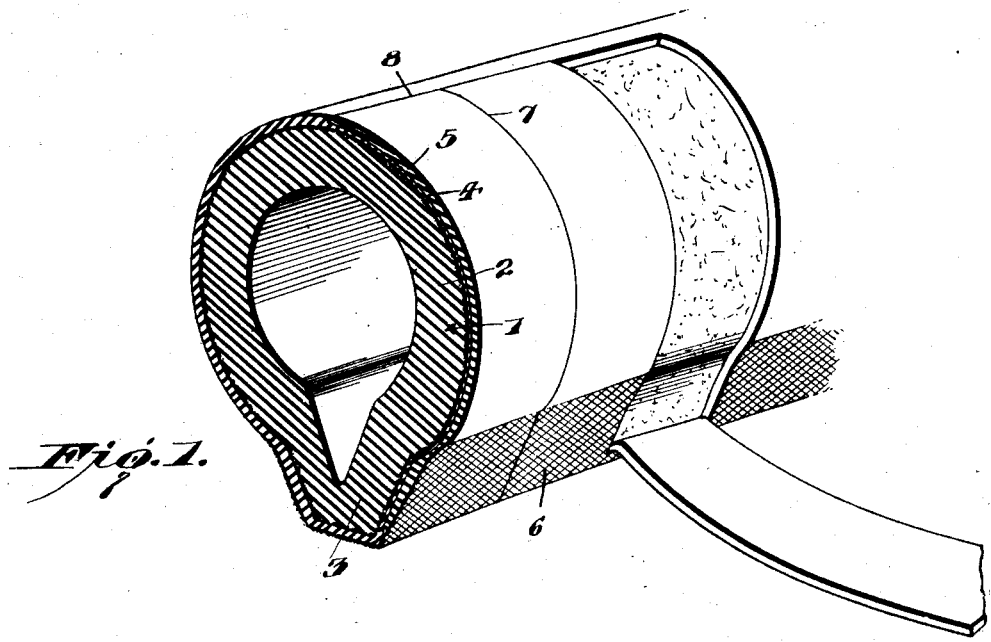
Figure 1 is a sectional perspective view illustrating the air bag embodying the invention and the manner in which the integument thereof is to be removed when it becomes roughened or has deteriorated to such an extent that it no longer presents a smooth surface and can, therefore, no longer be employed in vulcanizing tires.

The bag embodying the invention comprises a body which is indicated in general by the reference numeral 1 and which consists of a body wall 2 and a nose 3, the said body being of hollow annular form and of the contour to be imparted to the interior of the tire in the process of vulcanization, as is usual in bags of this type. The first step in the construction of the body consists in building up the body of uncured rubber by any of the ordinary methods, and in accordance with the principles of the present invention, a fabric ply 4, preferably previously impregnated with uncured rubber, is incorporated in the uncured rubber of the body. When the body has been vulcanized, its exterior surface will be smooth and the body will possess, throughout the thickness of its walls, a desirable degree of softness adapting the body to expand when a fluid under pressure is supplied to its interior in the subsequent employment of the bag as a whole in vulcanizing tires. The purpose in view in providing the enveloping ply of fabric is to reenforce the body and insure of equal expansion at all points, and this ply is of particular value where the body is molded in two parts which are subsequently spliced, the fabric being preferably applied or incorporated after the splicing has been effected, it being understood that the said fabric ply will reenforce the body along the splice and particularly at any point where the splice may be imperfect, and will overcome any tendency of the splice to pull apart. In incorporating the ply in the body, the impregnated ply may be applied about the shaped mass of uncured rubber which is to constitute the body and a thin layer of uncured rubber then applied about the ply, or the application of this thin layer of uncured rubber may be avoided by applying a greater quantity of uncured rubber to one side of the fabric ply at the time of impregnating the same and, when arranging the ply, so disposing the same that the said side will be presented outwardly.

After the body has been semi-cured by vulcanization, the toe or bead portion 3 has applied to its outer surface any suitable cement, but no cement is applied to the outer surface of the body wall 2 of the said body.

Figure 2:
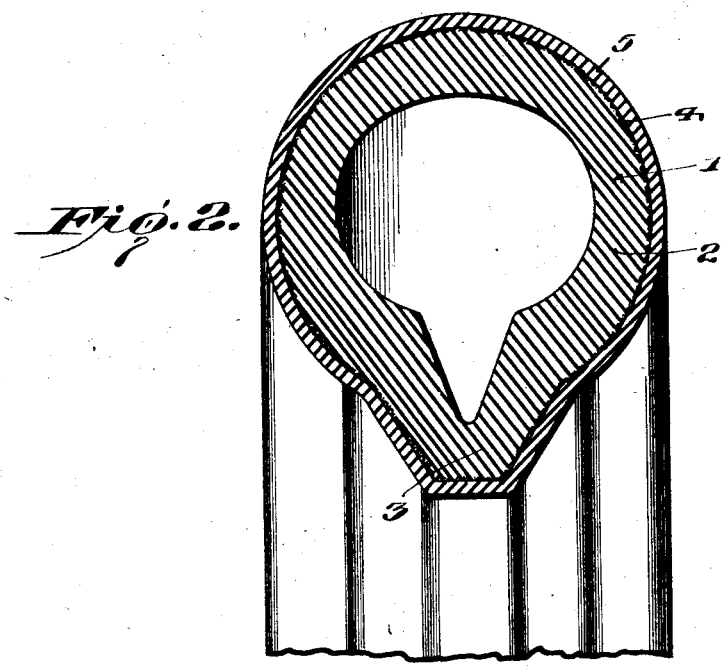
Figure 2 is a sectional view through the bag illustrating the first step in the method of constructing the bag or resurfacing the same.
Figure 3:
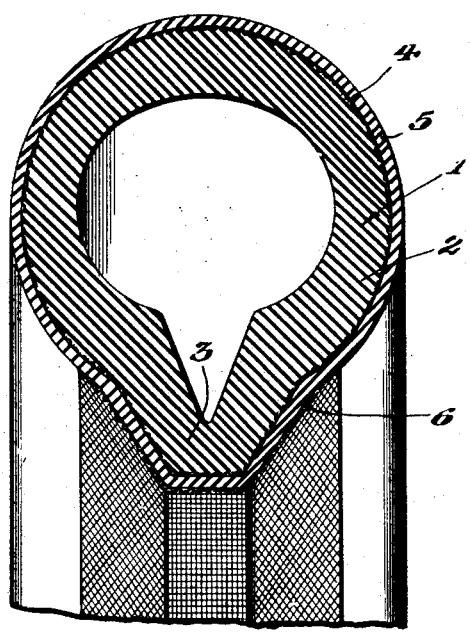
Figure 3 is a view similar to Figure 2, illustrating the second step in the construction and likewise the resurfacing of the bag.
Figure 4:
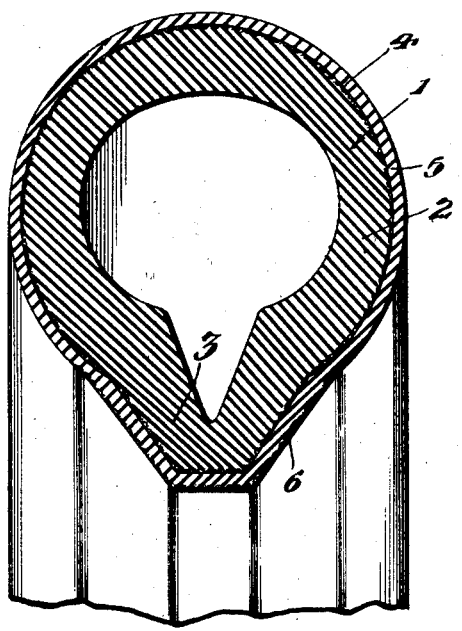
Figure 4 is a similar view illustrating the finished bag.

The next step in the method of producing the bag consists in applying the outer surface of the walls of the body a comparatively thin layer of uncured rubber, as shown in Figure 2, and which layer is indicated by the numeral 5, the layer completely enveloping the body and being, in practice, approximately one-eighth of an inch in thickness. It will be understood, of course, that the layer or ply 5 is of green or raw rubber and of uniform thickness. If desired, although not necessary, a further step may be followed which consists in applying over the outer surface of the layer 5 at that portion which envelops the nose 3, a fabric strip 6 which has previously been impregnated with rubber, this strip being of uniform width and extending circumferentially of the inner side of the assemblage, as clearly shown in Fig. 3 of the drawings. Finally, the assemblage thus produced is placed within a mold and subjected to a second vulcanization or curing, a fluid under pressure being, of course, admitted into the body of the bag during this step. As previously explained, in forming the body of the bag, the same is subjected to vulcanization so that it becomes semi-cured, and in the final step of vulcanization, the layer 5 which constitutes the investing integument of the completed bag, is cured, but to a less degree than the body of the bag in view of the prior semi-curing of the body. However, in this final curing step, the integument 5 does not become integrally united with the surface of the body 1, but only superficially and comparatively weakly united thereto.

The bag is now in condition for use in vulcanizing tires and it may be repeatedly employed for this purpose and, in fact, until the surface of the investing integument 5 becomes roughened or has deteriorated to such an extent that further use of the bag in this condition is inadvisable. It is when the bag is in this condition that the rasping and other methods heretofore referred to have been resorted to in order to attempt resurfacing of the bag but in accordance with the principles of the present invention, this is accomplished in a radically different manner as will now be explained.

In preparing the bag for resurfacing, incisions 7 are made transversely at suitable intervals in the integument 5, as shown in Figure 1 of the drawings, and an incision 8 is made circumferentially of the bag in said integument, and the integument between these incisions 7 is peeled or stripped from the body of the bag in the manner clearly shown in the said figure, until the entire integument has been removed. In making the incisions, care is taken to avoid cutting into the surface of the body of the bag. Due to the fact that the integument is not integrally vulcanized to the body of the bag, the strip-like portions thereof may be readily peeled from the said body. However, the adhesion of the integument to the surface of the body, during the life of the integument, is sufficiently secure to prevent any displacement of the integument or distortion thereof when the bag is employed in vulcanizing tires, and yet when the integument is to be stripped from the body of the bag, no difficulty will be experienced in accomplishing this and the task may be performed in a short period of time. After the entire worn integument has been removed, a fresh layer of rubber in the green state is applied to the surface of the body to envelop the same, as in the process of originally producing the bag.

In practice, it has been found that a bag constructed in accordance with the invention may be employed in approximately fifty vulcanizations before it becomes necessary to resurface the body of the same, and it will be evident that the body may be resurfaced a considerable number of times, thus greatly prolonging the life of the bag as compared with that of an ordinary bag.

It will be evident from the foregoing that great economy is effected by the employment of the air bag embodying the invention and that due to the minimum labor, time and expense involved in resurfacing the body of the bag, a manufacturer employing the bag in the vulcanization of tires, is enabled to put out tires of a better quality at a lower cost than a manufacturer who employs the ordinary air bags, inasmuch as due to the fact that when an ordinary air bag becomes rough or has deteriorated, it must be entirely discarded and, therefore, the tendency is for a manufacturer employing the same to extend the use of such bags beyond their period of actual usefulness in order to effect economy in manufacture, notwithstanding the fact that the tires which he produces will be somewhat defective.

It will also be evident from the foregoing description of the invention that the body of the air bag is not liable to become over-vulcanized or overcured for the reason that the investment or surface layer 5 thereof is repeatedly renewed and the several investing integuments or layers, when applied, will take up the sulphur content of the rubber of the tires being vulcanized, thus preventing the sulphur reaching the body of the bag. It will furthermore be evident that there is a distinct advantage in locating the fabric ply 4 inwardly of the outer surface of the body of the bag, in view of the fact that, while the ply reenforces the said body in a uniform manner, nevertheless, it does not come in contact with the removable integument, which would be the case if it were located at the outer surface of the said body and which would result in a more rapid deterioration of the cords of the fabric and likewise not provide for a surface union of the investing integument and the body. On the other hand, by locating the fabric ply in the manner stated, the body of the bag has a smooth outer surface of rubber to which the investing integument uniformly adheres.

In removing the integument the width of the strip-like portions or, in other words, the distance between the incisions 7 which are made in the integument, will depend upon the thickness of the integument and the extent to which it has deteriorated. If found desirable, a gentle heat may be applied to the bag at the time of stripping or peeling the integument therefrom in order to lessen the adhesion of the integument to the surface of the body of the bag.

It will furthermore be evident from the foregoing description of the invention, that the principles thereof are not restricted to the employment of any particular construction of bag body so long as the body has a smooth exterior surface of rubber, and, therefore, any number of the fabric plies might be incorporated in the body and, of course, the contour of the body may be varied in accordance with the contour of the tires to be vulcanized.

Having thus described the invention, what we claim is:

An air bag for use in the vulcanization of tires comprising a body of rubber material, the wall of which is relatively thick, the body having a smooth rubber surface, a ply of fabric incorporated in the body and extending about all sides thereof and located inwardly of and close to the exterior surface of the body, and a layer of rubber material thinner than the wall of the body and investing the body and superficially removably united thereto.

In testimony whereof we affix our signatures.

HERBERT C. RIES. [L. s.]
LEE WHYMS. [L. s.]